(12) United States Patent
Yamasaki et al.

(10) Patent No.: US 10,792,710 B2
(45) Date of Patent: Oct. 6, 2020

(54) SMEARING MEMBER WASHING METHOD AND SMEAR PREPARING APPARATUS

(71) Applicant: SYSMEX CORPORATION, Kobe-shi, Hyogo (JP)

(72) Inventors: Mitsuo Yamasaki, Kobe (JP); Noriyuki Nakanishi, Kobe (JP); Masahiko Fukushima, Kobe (JP); Hiroyuki Koga, Kobe (JP)

(73) Assignee: Sysmex Corporation, Hyogo (JP)

( * ) Notice: Subject to any disclaimer, the term of this patent is extended or adjusted under 35 U.S.C. 154(b) by 65 days.

(21) Appl. No.: 15/944,986

(22) Filed: Apr. 4, 2018

(65) Prior Publication Data

US 2018/0290181 A1 Oct. 11, 2018

(30) Foreign Application Priority Data

Apr. 6, 2017 (JP) ................. 2017-075802

(51) Int. Cl.
| | |
|---|---|
| B08B 3/08 | (2006.01) |
| G01N 1/28 | (2006.01) |
| C11D 3/04 | (2006.01) |
| B08B 7/02 | (2006.01) |
| B08B 3/04 | (2006.01) |
| B05C 11/02 | (2006.01) |
| G01N 35/00 | (2006.01) |
| G01N 35/02 | (2006.01) |
| G01N 1/31 | (2006.01) |

(52) U.S. Cl.
CPC ............. *B08B 3/08* (2013.01); *B05C 11/023* (2013.01); *B08B 3/041* (2013.01); *B08B 7/028* (2013.01); *C11D 3/04* (2013.01); *C11D 3/046* (2013.01); *G01N 1/2813* (2013.01); *G01N 35/00029* (2013.01); *G01N 35/026* (2013.01); *G01N 1/312* (2013.01); *G01N 2035/00039* (2013.01); *G01N 2035/00089* (2013.01); *G01N 2035/00138* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,080,252 A | * | 3/1963 | Freier | A61B 42/60 427/2.3 |
| 5,854,075 A | * | 12/1998 | Levine | G01N 1/2813 436/46 |
| 2003/0003022 A1 | * | 1/2003 | Tamura | G01N 1/2813 422/519 |
| 2017/0002299 A1 | * | 1/2017 | Holtz | C11D 3/3947 |

FOREIGN PATENT DOCUMENTS

JP H11-506826 A 6/1999

* cited by examiner

*Primary Examiner* — Erin F Bergner
(74) *Attorney, Agent, or Firm* — Brinks Gilson & Lione

(57) ABSTRACT

Disclosed is a method for washing a smearing member, the method including: dropping a washing agent on a glass slide; and causing the smearing member to be in contact with the washing agent on the glass slide, to wash the smearing member.

18 Claims, 10 Drawing Sheets

DROP

LOWER

RECEDE

LEAVE TO STAND

SMEAR

FIG. 4

|  | WHEN SMEAR IS PREPARED | WHEN SMEARING MEMBER IS WASHED |
|---|---|---|
| LIQUID TO DROP | SAMPLE (BLOOD) | FIRST WASHING AGENT |
| DISCHARGE AMOUNT | 2 TO 3 μL | 15 μL |
| CONTACT TIME PERIOD | SEVERAL SECONDS | 5 MINUTES |
| DRYING TIME PERIOD | 48 SECONDS | 3 MINUTES |

SMEARING MEMBER WASHING METHOD AND SMEAR PREPARING APPARATUS

CROSS REFERENCE TO RELATED APPLICATIONS

This application claims priority from prior Japanese Patent Application No. 2017-075802, filed on Apr. 6, 2017, entitled "SMEARING MEMBER WASHING METHOD AND SMEAR PREPARING APPARATUS", the entire content of which is incorporated herein by reference.

FIELD OF THE INVENTION

The present invention relates to a smearing member washing method and a smear preparing apparatus.

BACKGROUND

Smear preparing methods are known in which a biological sample such as blood is dropped on a glass slide and the sample is widely and thinly spread by means of a smearing member to prepare a smear. Since the sample attaches to the smearing member, the smearing member needs to be washed every time a sample is smeared. For example, Japanese National Phase PCT Laid-Open Publication No. H11-506826 discloses a smearing member washing method in which for each smearing of a sample, the smearing member is wiped in order to remove the sample attached to the smearing member.

SUMMARY OF THE INVENTION

The scope of the present invention is defined solely by the appended claims, and is not affected to any degree by the statements within this summary.

In such a conventional smearing member washing method as in Japanese National Phase PCT Laid-Open Publication No. H11-506826, for each smearing of a sample, the smearing member is wiped in order to remove the sample attached to the smearing member. However, if the number of times of smearing is increased, dirt such as protein accumulates at the end face of the smearing member, and thus, the shape of the end face of the smearing member is changed. This results in difficulty in maintaining the smeared state to be constant. Thus, when the number of times of smearing is increased, a user needs to periodically perform maintenance work such as cleaning the smearing member or replacing the smearing member, in order to maintain the smeared state at a desired state. Thus, there is a problem that increase in the number of times of smearing results in increased burden of work on the user for maintaining the smeared state at a desired state.

The present invention is directed to maintaining the smeared state at a desired state even when the number of times of smearing is increased, while increase in burden of work on the user is suppressed.

A method for washing a smearing member according to a first aspect of the present invention is a method for washing a smearing member, the method including: dropping a washing agent (11) on a glass slide (10); and causing the smearing member (42) to be in contact with the washing agent (11) on the glass slide (10), to wash the smearing member (42).

A method for washing a smearing member according to a second aspect of the present invention is a method for washing a smearing member (42), the method including: washing the smearing member (42) by means of a first washing liquid (12); and washing the smearing member (42) by means of a second washing liquid (11) having stronger detergency than the first washing liquid (12), wherein the number of times of washing the smearing member (42) by means of the second washing liquid (11) is smaller than the number of times of washing the smearing member (42) by means of the first washing liquid (12).

A smear preparing apparatus (100) according to a third aspect of the present invention includes: a smearing member (42) configured to smear a sample on a glass slide (10) by being moved on the glass slide (10) while being in contact with the sample; a glass slide transporting section (120) configured to transport the glass slide (10) to a smearing position (403); and a controller (230) programmed to control operation of each of the smearing member (42) and the glass slide transporting section (120), wherein the controller (230) is programmed to perform control of washing the smearing member (42), by: causing the glass slide transporting section (120) to transport the glass slide (10) to the smearing position (403); causing a washing agent (11) to be dropped on the glass slide (10); and causing the smearing member (42) to be in contact with the washing agent (11) on the glass slide (10).

A smear preparing apparatus (100) according to a fourth aspect of the present invention includes: a smearing member (42) configured to smear a sample; and a controller (230) programmed to perform: control of causing the smearing member (42) to be washed by means of a first washing liquid (12); control of causing the smearing member (42) to be washed by means of a second washing liquid (11) having stronger detergency than the first washing liquid (12); and control such that the number of times of washing the smearing member (12) by means of the second washing liquid (11) is smaller than the number of times of washing the smearing member (42) by means of the first washing liquid (12).

BRIEF DESCRIPTION OF THE DRAWINGS

FIG. 4 is a table showing one example of modes for "when a smear is prepared" and "when the smearing member is washed";

DETAILED DESCRIPTION OF THE PREFERRED EMBODIMENTS

Hereinafter, embodiments are described with reference to the drawings.

(Outline of Smear Preparing Method)

Figure 1:
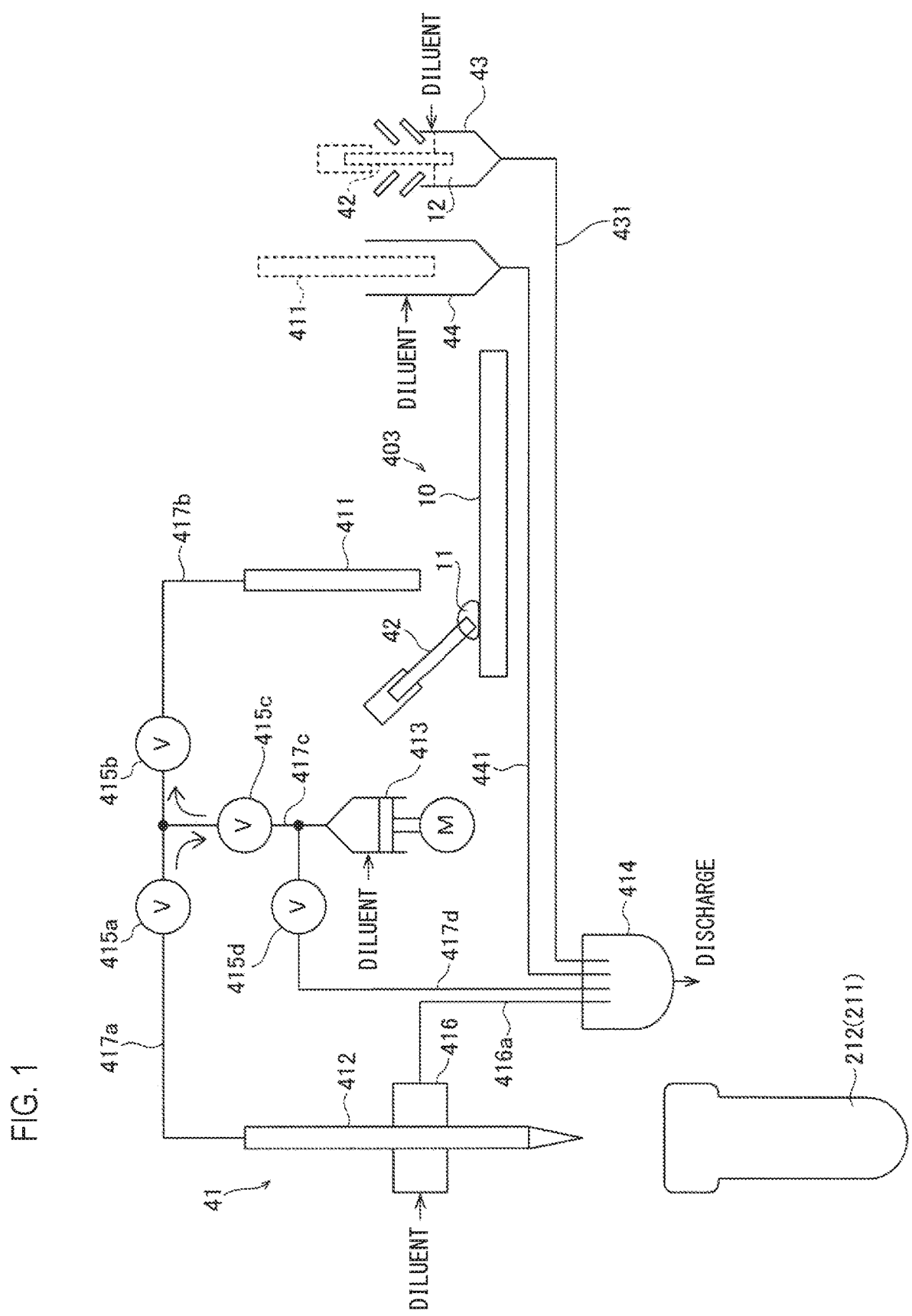
FIG. 1 is a schematic diagram for describing a smear preparing method.

With reference to FIG. 1, the outline of a smear preparing method according to one embodiment is described.

A smear preparing method according to the present embodiment is a method for preparing a smear by smearing a sample such as a specimen, on a glass slide 10. The specimen is a biological sample taken from a test specimen (subject), and is blood, urine, or cells, for example. The smear preparing method is a method for preparing a smear by: dropping a sample on a glass slide 10; and moving a smearing member 42 on the glass slide 10 while causing the smearing member 42 to be in contact with the sample.

As shown in FIG. 1, in the smearing process of the smear preparing method, a specimen as a sample is aspirated by an aspiration tube 412 from a specimen container 211. The aspirated specimen is dropped from a dropping part 411 onto a glass slide 10. Specifically, in a state where valves 415a and 415c are open and valves 415b and 415d are closed, the quantification part 413 performs aspiration, whereby the specimen is aspirated from the aspiration tube 412 via pipes 417a and 417c. Then, in a state where the valves 415b and 415c are open and the valves 415a and 415d are closed, the quantification part 413 performs discharge, whereby the specimen is dropped from the dropping part 411 via the pipes 417c and 417b.

Then, in a state where the smearing member 42 is in contact with the specimen, the smearing member 42 is moved on the glass slide 10. Accordingly, the specimen is thinly spread on the glass slide 10. The glass slide 10 having the specimen smeared thereon is sent out and dried by a first drying processing section 50.

Every time a specimen is smeared, the members used in aspirating, dropping and smearing the specimen are washed. Specifically, the outer periphery of the aspiration tube 412 is washed by means of a diluent by an aspiration tube washing part 416. The diluent used in the washing is sent to a waste liquid chamber 414 via a pipe 416a. The inside of the aspiration tube 412 and the inside of each of the quantification part 413, the pipes 417a, 417b, and 417c are washed by causing a diluent to pass therethrough. The diluent used in the washing is sent to the waste liquid chamber 414 via the valve 415d and a pipe 417d. The dropping part 411 is washed by means of a diluent by a dropping part washing part 44. The diluent used in the washing is sent to the waste liquid chamber 414 via a pipe 441. The smearing member 42 is washed by means of a washing liquid 12 containing a diluent by a smearing member washing part 43. Specifically, in the smearing member washing part 43, the smearing member 42 is washed through application of ultrasonic wave thereto in the washing liquid 12. The washing liquid 12 used in the washing is sent to the waste liquid chamber 414 via a pipe 431. The washing liquid 12 is a solution obtained by adding a surfactant in a sodium chloride aqueous solution, for example. Accordingly, the specimen is removed from the member used for smearing the specimen, and smearing of the next specimen is allowed. It should be noted that the washing liquid 12 is one example of "first washing liquid" in claims.

Here, when a plurality of specimens are smeared by use of the smearing member 42, an attached matter such as particulates is accumulated on the surface of the smearing member 42. In this case, the shape of the portion of the smearing member 42 coming into contact with the sample is changed, and thus, the smeared state becomes no longer constant. For example, when the smearing member 42 is brought into contact with a sample, the attached matter on the smearing member 42 hinders the sample from being spread in the width direction of the smearing member 42, whereby the amount of the sample in the width direction is prevented from being constant. If the smearing member 42 is moved in this state, the sample near the center portion becomes thick, and the sample near the end portions becomes thin.

Thus, in the present embodiment, as shown in FIG. 1 and FIG. 2, in order to remove the attached matter on the smearing member 42, a washing agent 11 is dropped on the glass slide 10, and the smearing member 42 is caused to be in contact with the washing agent 11 on the glass slide 10, whereby the smearing member 42 is washed. That is, on the basis of a predetermined condition and separately from washing of the smearing member 42 by means of the washing liquid 12, the smearing member 42 is caused to be in contact with the washing agent 11 on the glass slide 10, whereby the smearing member 42 is washed. Thus, since the smearing member 42 can be washed by means of the washing agent 11 dropped on the glass slide 10, the smearing member 42 can be washed by means of the washing agent 11, separately from washing of the smearing member 42 performed for each smearing. As a result, the attached matter accumulated on the smearing member 42 can be effectively removed, and thus, the shape of the end face of the smearing member 42 can be maintained to be constant. Thus, the smeared state can be maintained to be constant. In addition, since the smearing member 42 can be washed by use of the glass slide 10 which is used in smearing, washing of the smearing member 42 can be easily automated. Accordingly, increase in burden of work on the user can be suppressed. As a result of these, even when the number of times of smearing is increased, the smeared state can be maintained at a desired state, while increase in the burden of work on the user is suppressed. In addition, since the smearing member 42 is washed by use of the glass slide 10, there is no need to separately provide a dedicated member for washing, and thus, the configuration of the apparatus can be suppressed from becoming complicated. It should be noted that the washing agent 11 is one example of "second washing liquid" in claims.

The washing agent 11 has stronger detergency than the washing liquid 12. For example, the washing agent 11 is a solution that contains a component that degrades protein. By means of the washing agent 11, an attached matter that contains protein can be easily removed from the smearing member 42. For example, the washing agent 11 is a solution that contains an oxidizing agent that degrades protein. By means of the washing agent 11, an attached matter that contains protein can be chemically degraded, and thus, the attached matter can be more reliably removed from the smearing member 42. Preferably, the washing agent 11 is a solution that contains hypochlorite. Due to stable oxidative degradation caused by hypochlorite and a hypochlorous acid derived from hypochlorite, the attached matter can be more effectively removed from the smearing member 42. The washing agent 11 is a sodium hypochlorite aqueous solution. For example, CELLCLEAN (registered trade mark) may be used as the washing agent 11.

The smearing member 42 is washed by causing the smearing member 42 to be in contact with the washing agent 11 on the glass slide 10 for a predetermined time period. The time period for which the smearing member 42 is caused to be in contact with the washing agent 11 when the smearing member 42 is washed is longer than the time period for which the smearing member 42 is caused to be in contact with a sample when a smear is prepared. Since the smearing member 42 can be caused in contact with the washing agent 11 for a time period longer than the time period for which the smearing member 42 is caused to be in contact with a sample when a smear is prepared, the attached matter on the smearing member 42 can be more effectively degraded and removed. For example, the smearing member 42 is washed by causing the smearing member 42 to be in contact with the washing agent 11 on the glass slide 10 for five minutes. Meanwhile, the time period for which the smearing member 42 is caused to be in contact with a sample when a smear is prepared is several seconds, for example.

The smearing member 42 is washed by causing the smearing member 42 to move on the glass slide 10 while causing the smearing member 42 to be in contact with the washing agent 11 on the glass slide 10. Since the smearing member 42 is caused to move on the glass slide 10, the washing agent 11 attached to the surface of the smearing member 42 can also be moved from the smearing member 42 to the glass slide 10, and the moved washing agent 11 can be spread on the glass slide 10 to be quickly dried. Accordingly, scattering of the washing agent 11 can be suppressed. Since the amount of the washing agent 11 attached to the smearing member 42 can be reduced, the washing agent 11 on the smearing member 42 can be easily washed off. In addition, by causing the smearing member 42 to move relative to the glass slide 10 and the washing agent 11, the attached matter on the smearing member 42 can be effectively detached.

After the smearing member 42 is washed by means of the washing agent 11 on the glass slide 10, the washing agent 11 attached to the smearing member 42 is removed. Specifically, the washing agent 11 attached to the smearing member 42 is removed by washing the smearing member 42 by means of the washing liquid 12 for washing the smearing member 42 every time a smear is prepared, after washing the smearing member 42 by means of the washing agent 11. That is, in order to remove the washing agent 11, the smearing member 42 is washed through application of ultrasonic wave thereto in the washing liquid 12. Since the washing agent 11 can be removed from the smearing member 42 by use of the washing liquid 12 for washing the smearing member 42 for each smearing, there is no need to separately provide a dedicated removing member for removing the washing agent 11. Also with this, the configuration of the apparatus can be suppressed from becoming complicated.

The time period for which the smearing member 42 is washed by means of the washing agent 11 is longer than the time period for which the smearing member 42 is washed by means of the washing liquid 12 when a smear is prepared. Since the smearing member 42 can be washed by means of the washing agent 11 for a time period longer than the time period for which washing is performed by means of the washing liquid 12 when a smear is prepared, the attached matter accumulated on the smearing member 42 can be more effectively degraded and removed. For example, the time period for which the smearing member 42 is washed by means of the washing agent 11 is five minutes. Meanwhile, the time period for which the smearing member 42 is washed by means of the washing liquid 12 when a smear is prepared is about 10 seconds to 20 seconds. The time period for which the smearing member 42 is washed by means of the washing liquid 12 in order to remove the washing agent 11 is about 30 seconds to 60 seconds. That is, the time period for which the smearing member 42 is washed by means of the washing liquid 12 in order to remove the washing agent 11 is a time period about three times the time period for which the smearing member 42 is washed by means of the washing liquid 12 when a smear is prepared.

The amount of the washing agent 11 to be dropped on a glass slide 10 when the smearing member 42 is washed is greater than the amount of a sample to be dropped on a glass slide 10 when a smear is prepared. Since the washing agent 11 can be brought into contact with an area greater than the area where the smearing member 42 comes into contact with the sample, the attached matter on the smearing member 42 in the area that comes into contact with the sample can be reliably removed. Accordingly, the smeared state can be easily maintained to be constant. For example, when the smearing member 42 is washed by means of the washing agent 11, the amount of the washing agent 11 to be dropped on a glass slide 10 is about 10 μL to 20 μL. Meanwhile, the amount of a sample to be dropped on a glass slide 10 when a smear is prepared is about 2 to 3 μL.

The smearing member 42 may be washed by means of the washing agent 11 at a place other than on the glass slide 10. For example, the smearing member 42 may be washed by means of the washing agent 11 in a washing chamber. Alternatively, the smearing member 42 may be washed through application of ultrasonic wave thereto in the washing agent 11 in a washing chamber. The washing chamber may be used in common with the smearing member washing part 43 in which washing is performed by means of the washing liquid 12.

The method for washing the smearing member 42 includes: a method for washing the smearing member 42 by means of the washing liquid 12; and a method for washing the smearing member 42 by means of the washing agent 11 which has stronger detergency than the washing liquid 12. The number of times of washing the smearing member 42 by means of the washing agent 11 is smaller than the number of times of washing the smearing member 42 by means of the washing liquid 12. For example, the number of times of washing the smearing member 42 by means of the washing liquid 12 is about 100 to 500, whereas the number of times of washing the smearing member 42 by means of the washing agent 11 is one.

(Smearing Member Washing Method)

An example of a method for washing the smearing member 42 is described with reference to FIG. 2 and FIG. 3.

Figure 2A:
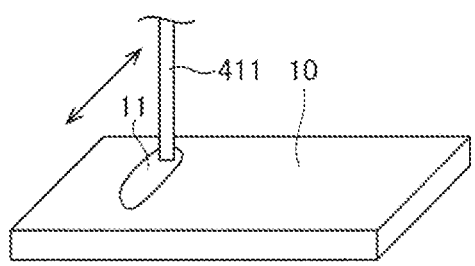
FIGS. 2A through 2E are diagrams for describing washing of a smearing member in the smear preparing method.
Figure 3:
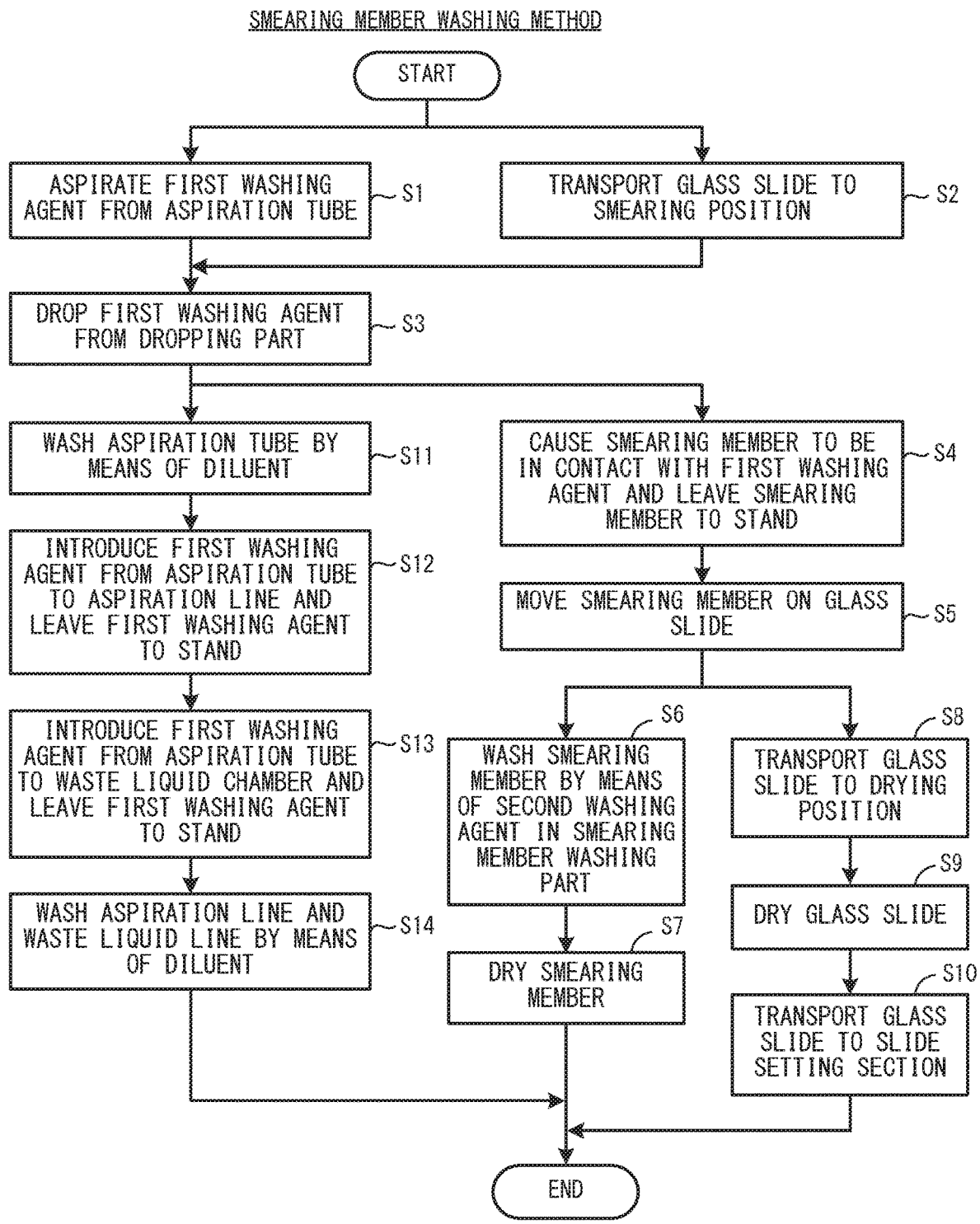
FIG. 3 is a flow chart for describing a method for washing the smearing member.

First, in step S1 shown in FIG. 3, the washing agent 11 is aspirated from the aspiration tube 412. In step S2, in parallel with the process in step S1, a glass slide 10 is transported to a smearing position 403. In step S3, the washing agent 11 is dropped from the dropping part 411. Specifically, as shown in FIG. 2A, in a state where the leading end of the dropping part 411 is located above and close to the glass slide 10, the washing agent 11 is dropped on the glass slide 10 while the dropping part 411 is moved in the width direction (X direction) of the glass slide 10. In this case, the distance by which the dropping part 411 is moved in the X direction is smaller than the length in the width direction (X direction) of the smearing member 42. When the dropping of the washing agent 11 ends, the dropping part 411 is raised to be away from the glass slide 10.

Figure 2B:
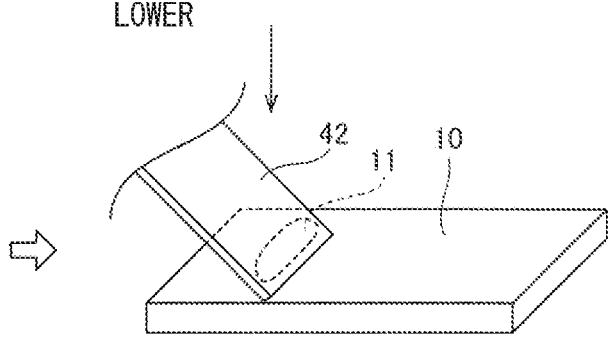
Figure 2C:
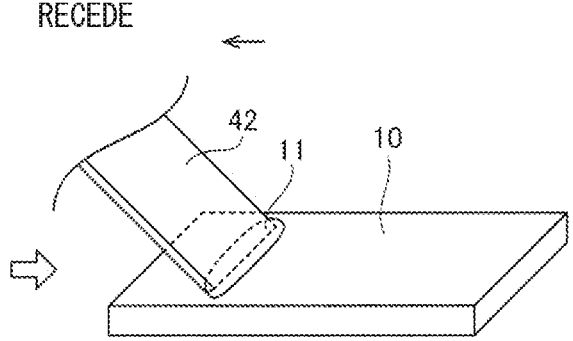
Figure 2D:
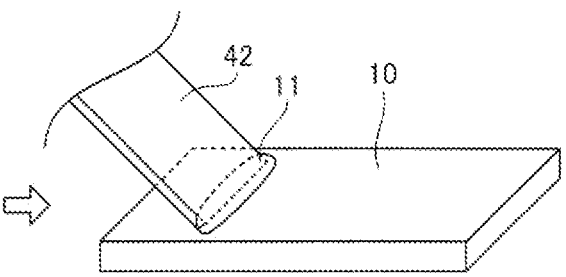

In step S4 shown in FIG. 3, the smearing member 42 is left to stand while being in contact with the washing agent 11. Specifically, as shown in FIG. 2B, the smearing member 42 is lowered onto the glass slide 10. In this case, the leading end of the smearing member 42 is disposed at a Y2 direction side relative to the dropped washing agent 11. Then, as shown in FIG. 2C, the smearing member 42 is caused to recede to a Y1 direction side. Accordingly, the smearing member 42 comes into contact with the washing agent 11 on the glass slide 10. When the smearing member 42 comes into contact with the washing agent 11 on the glass slide 10, the washing agent 11 wets the surface of the smearing member 42 and spreads thereat. That is, the washing agent 11 spreads to the outsides of the ends in the X direction of the smearing member 42. Then, as shown in FIG. 2D, the smearing member 42 is left to stand in a state of being in contact with the washing agent 11 on the glass slide 10. For example, the smearing member 42 is caused to be in contact with the washing agent 11 for five minutes. Accordingly, the attached matter on the smearing member 42 is degraded by the washing agent 11.

Figure 2E:
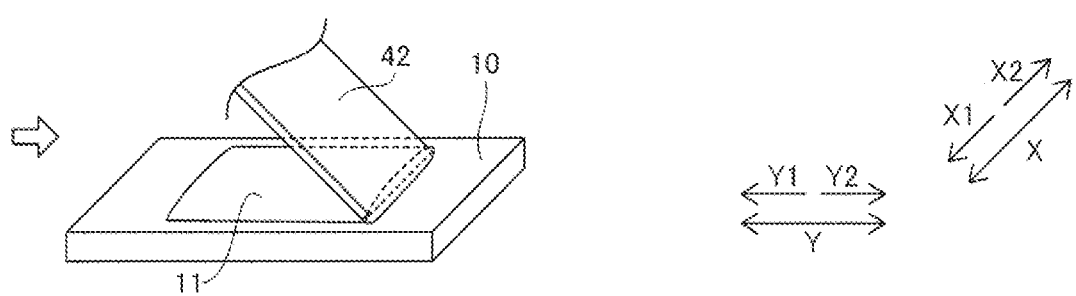

In step S5 shown in FIG. 3, the smearing member 42 is moved on the glass slide 10. Specifically, as shown in FIG. 2E, the smearing member 42 is moved, on the glass slide 10, in the longitudinal direction (Y2 direction) of the glass slide 10. Accordingly, the washing agent 11 on the glass slide 10 is smeared onto the glass slide 10.

In step S6 shown in FIG. 3, in the smearing member washing part 43, the smearing member 42 is washed by means of the washing liquid 12. Specifically, in the smearing member washing part 43, in a state where the smearing member 42 is immersed in the washing liquid 12, the smearing member 42 is subjected to ultrasonic wave washing. Accordingly, the attached matter and the washing agent 11 attached to the smearing member 42 are washed off. In step S7, the smearing member 42 is dried. Specifically, air is blown to the smearing member 42 in the smearing member washing part 43, whereby the smearing member 42 is dried.

In step S8, in parallel with the processes in steps S6 and S7, the glass slide 10 is transported to a drying position. Then, in step S9, the glass slide 10 is dried. Specifically, air is blown to the upper face of the glass slide 10, whereby the glass slide 10 is dried. For example, air is blown to the glass slide 10 for three minutes to dry the glass slide 10.

In step S11, in parallel with the processes in steps S4 to S10, the aspiration tube 412 is washed by means of a diluent. Specifically, the aspiration tube 412 is washed by means of a diluent by the aspiration tube washing part 416. In step S12, the washing agent 11 is introduced from the aspiration tube 412 into the aspiration line, and is left to stand. Specifically, the washing agent 11 is aspirated by the quantification part 413 into the pipes 417a to 417c. Then, in a state where the washing agent 11 has been introduced in the pipes 417a to 417c, the washing agent 11 is left to stand for five minutes. Then, in a state where the dropping part 411 is disposed in the dropping part washing part 44, the washing agent 11 in the pipes 417a to 417c is discharged from the dropping part 411.

In step S13, the washing agent 11 is introduced from the aspiration tube 412 into the waste liquid chamber and is left to stand. Specifically, the washing agent 11 is aspirated by the quantification part 413 into the pipe 417d. Then, in a state where the washing agent 11 has been introduced in the pipe 417d, the washing agent 11 is left to stand for one minute. In step S14, the aspiration line and the waste liquid line are each washed by means of a diluent. As a result of these, members such as the smearing member 42, the dropping part 411, and the aspiration tube 412 are washed.

With reference to FIG. 4, one example of modes for "when a smear is prepared" and "when the smearing member is washed" is described.

When a smear is prepared, about 2 to 3 μL of a sample (blood) is discharged and dropped from the dropping part 411. The smearing member 42 is caused to be in contact with the sample for about several seconds. After the smearing member 42 is washed by means of the washing liquid 12, air is blown to the smearing member 42 for 48 seconds, whereby the smearing member 42 is dried.

When the smearing member 42 is washed by means of the washing agent 11, about 15 μL of the washing agent 11 is discharged and dropped from the dropping part 411. The smearing member 42 is caused to be in contact with the washing agent 11 for about five minutes. After the smearing member 42 is washed by means of the washing agent 11 and then washed by means of the washing liquid 12, air is blown to the smearing member 42 for three minutes, whereby the smearing member 42 is dried.

(Configuration Example of Smear Preparing Apparatus)

A configuration example of a smear preparing apparatus 100 is described with reference to FIG. 5. The smear preparing apparatus 100 is an apparatus for performing a smearing process of smearing a specimen onto a glass slide 10, and for performing a specimen staining process on the glass slide 10 having the specimen smeared thereon. The specimen is blood, for example.

Figure 5:
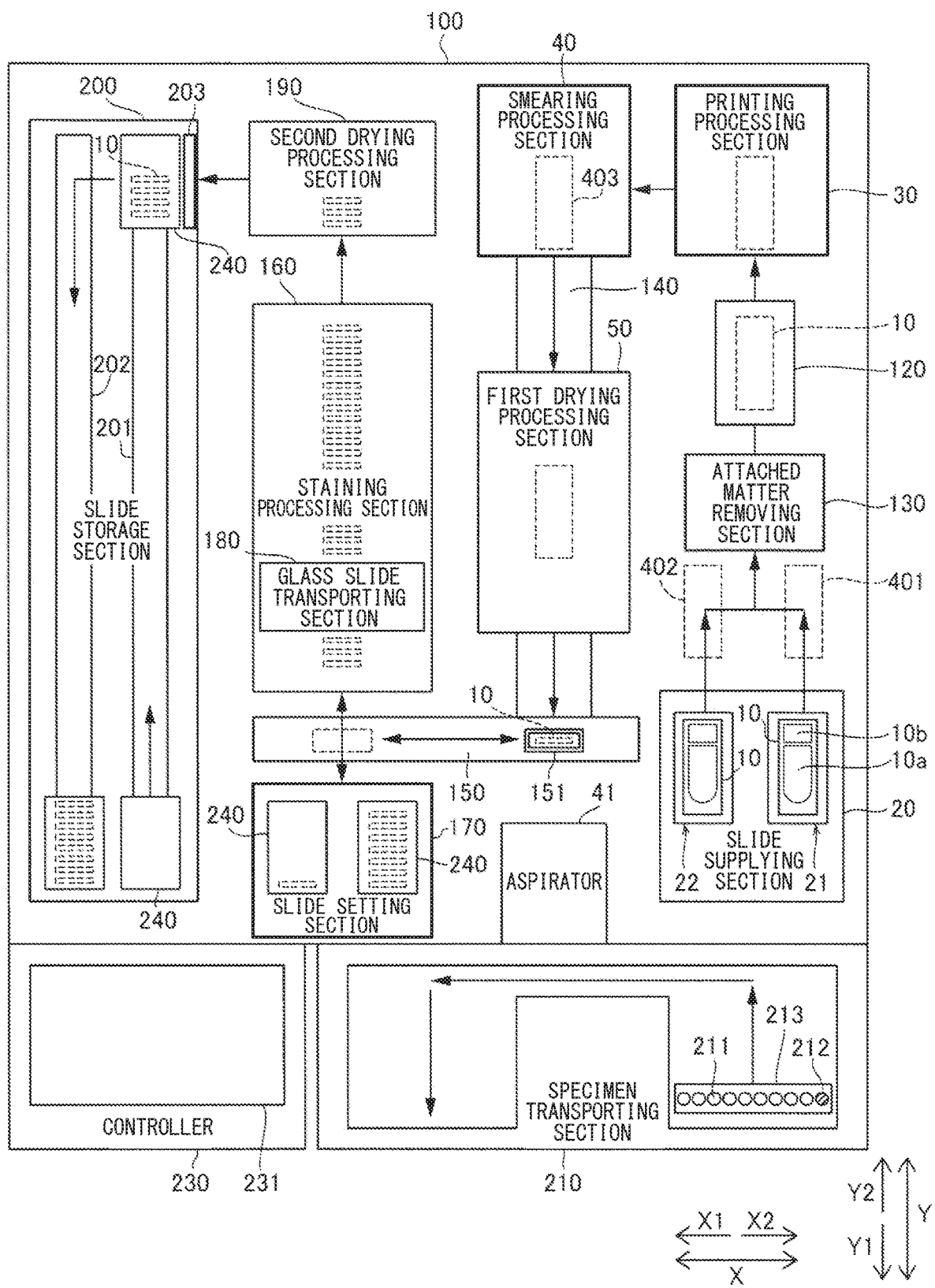
FIG. 5 is a schematic diagram showing a smear preparing apparatus.

In the configuration example shown in FIG. 5, the smear preparing apparatus 100 includes a slide supplying section 20, a printing processing section 30, a smearing processing section 40, a first drying processing section 50, a glass slide transporting section 120, an attached matter removing section 130, and a glass slide transporting section 140. In addition, in the configuration example shown in FIG. 5, the smear preparing apparatus 100 includes a glass slide transporting section 150, a staining processing section 160, a slide setting section 170, a glass slide transporting section 180, a second drying processing section 190, and a slide storage section 200. In the configuration example shown in FIG. 5, the smear preparing apparatus 100 further includes a specimen transporting section 210, an aspirator 41, and a controller 230. In the smear preparing apparatus, as long as at least a smearing processing section is provided as a processing section for processing the glass slide 10, other processing sections may not be provided. That is, the smear preparing apparatus may not include a printing processing section and a staining processing section.

In the following, two directions orthogonal to each other in a plane that is parallel to the installation surface of the smear preparing apparatus 100 (i.e., in a horizontal plane) is defined as an X direction and a Y direction, respectively. In the example shown in FIG. 5, the smear preparing apparatus 100 has a quadrangular outer shape along the X direction and the Y direction in a plan view. The X direction is defined as the left-right direction of the smear preparing apparatus 100, and the Y direction is defined as the depth direction of the smear preparing apparatus 100. A Y1 direction side is the near side of the apparatus, and a Y2 direction side is the far side of the apparatus. The up-down direction orthogonal to the horizontal plane is defined as a Z direction.

The specimen transporting section 210 is disposed at the nearest side in the smear preparing apparatus 100. In the specimen transporting section 210, a plurality of specimen containers 211 each containing a specimen and a container 212 containing the washing agent 11 are set, the set specimen containers 211 and the set container 212 are transported to a predetermined taking-in position. The specimen transporting section 210 transports a rack 213 holding a plurality of the specimen containers 211 and the container 212, for example. The aspirator 41 aspirates a liquid specimen such as blood or urine from a specimen container 211 transported by the specimen transporting section 210 to the taking-in position. The aspirator 41 also aspirates the washing agent 11 from the container 212 transported by the specimen transporting section 210 to the taking-in position. The aspirator 41 supplies the aspirated specimen or the aspirated washing agent 11 to the smearing processing section 40.

In the configuration example shown in FIG. 5, the slide supplying section 20 includes a first supplying section 21 and a second supplying section 22. The slide supplying section 20 may include one, or three or more supplying sections. With respect to the slide supplying section 20, many unused glass slides 10 having no specimen smeared thereon can be stored in each of the first supplying section 21 and the second supplying section 22. The glass slides 10 are each stored flat such that the smear surface thereof faces upward, in the first supplying section 21 and the second supplying section 22. The slide supplying section 20 is configured to hold each glass slide 10 such that the longitudinal direction of the glass slide 10 is aligned with the Y direction and the short direction of the glass slide 10 is aligned with the X direction.

The glass slide 10 is a plate-like member having a rectangular shape, for example. The glass slide 10 includes: for example, a smear region 10a in which a specimen is smeared; and a printing region 10b for indicating various types of information such as specimen information. The smear region 10a is formed in a center portion in the longitudinal direction, in a predetermined range extending in the longitudinal direction, for example. The printing region 10b is formed in a one-end portion in the longitudinal direction so as to be separated from the smear region 10a, for example. The printing region 10b is a portion treated so as to be printable as a result of the glass slide 10 being coated by use of a resin material, for example. In the printing region 10b, a specimen number, a date, a bar code, a two-dimensional code, or the like can be printed.

The first supplying section 21 and the second supplying section 22 have a substantially identical configuration. The first supplying section 21 and the second supplying section 22 are arranged alongside each other in the X direction. Each of the first supplying section 21 and the second supplying section 22 can supply the glass slides 10 one by one, by causing each glass slide 10 to move in the Y2 direction, the glass slide 10 being accommodated therein and not yet being subjected to smearing.

In the configuration example shown in FIG. 5, the glass slide transporting section 120 is provided so as to transport the glass slide 10, by moving at least among the slide supplying section 20, the printing processing section 30, and the smearing processing section 40. That is, the glass slide transporting section 120 functions as a transporting section that is used in common among the slide supplying section 20, the printing processing section 30, and the smearing processing section 40. A configuration may be employed in which the transportation of the glass slide 10 among the slide supplying section 20, the printing processing section 30, and the smearing processing section 40 may be performed by separate glass slide transporting sections.

The glass slide transporting section 120 can transport one glass slide 10, with the glass slide 10 held on the upper face of the glass slide transporting section 120, for example. The glass slide transporting section 120 can receive a glass slide 10 from the first supplying section 21. The glass slide transporting section 120 can receive a glass slide 10 from the second supplying section 22. The glass slide transporting section 120 can move in the horizontal direction (X-Y directions). The glass slide transporting section 120 can cause the held glass slide 10 to move in the up-down direction (the Z direction). The glass slide transporting section 120 can transport the held glass slide 10 to the processing position of each of the attached matter removing section 130, the printing processing section 30, and the smearing processing section 40. The glass slide transporting section 120 transports the glass slide 10 received from the slide supplying section 20, to the attached matter removing section 130, the printing processing section 30, and the smearing processing section 40 in this order. The glass slide 10, in a state of being held by the glass slide transporting section 120, is subjected to a predetermined process in each of the attached matter removing section 130, the printing processing section 30, and the smearing processing section 40. The glass slide transporting section 120 may be able to hold a plurality of the glass slides 10. The glass slide transporting section 120 may be able to move in the X-Y directions and unable to move in the Z direction.

In the configuration example shown in FIG. 5, the glass slide transporting section 120 transports the glass slide 10, with the longitudinal direction of the glass slide 10 aligned with the Y direction and with the short direction of the glass slide 10 aligned with the X direction. Accordingly, the transport route for the glass slide 10 in the X direction which is the left-right direction of the smear preparing apparatus 100 can be shortened.

The attached matter removing section 130 has a function of removing attached matter on the surface of the glass slide 10. The attached matter removing section 130 performs an attached matter removing process on the glass slide 10 in a state of being held on the upper face of the glass slide transporting section 120. For example, the attached matter removing section 130 is connected to a pressure source not shown and discharges air, thereby being able to blow off attached matters in the smear region 10a and the printing region 10b of the glass slide 10. The attached matters are small foreign bodies such as glass powder and dust, for example.

In the configuration example shown in FIG. 5, the printing processing section 30 is configured to perform a printing process. The printing process is a process of printing various types of information such as specimen information, in the printing region 10b on the surface of the glass slide 10. The printing process onto the printing region 10b can be performed by a known printing part such as a thermal transfer printer or an ink jet printer, for example.

In the configuration example shown in FIG. 5, the smearing processing section 40 is configured to perform a smearing process. The smearing processing section 40 can smear a sample containing a specimen, onto the smear region 10a of the glass slide 10. The smearing processing section 40 performs smearing of a specimen onto the glass slide 10 in a state of being held on the upper face of the glass slide transporting section 120. The smearing process is a process of applying a specimen onto the smear region 10a on the surface of the glass slide 10. The specimen is smeared in an amount and an application thickness that are appropriate for microscopy using the glass slide 10. The smearing process is performed according to a smearing method (so-called wedge method) using a smearing member 42 such as a spreader glass.

In the configuration example shown in FIG. 5, the printing processing section 30 and the smearing processing section 40 are disposed so as to be adjacent to each other in the X direction. The glass slide transporting section 120 is configured to transport a glass slide 10 from the printing processing section 30 to the smearing processing section 40, and then, to receive a next glass slide 10 from the slide supplying section 20.

In the configuration example shown in FIG. 5, the glass slide transporting section 140 has a function of sending out the glass slide 10 having been transported to the smearing processing section 40, to the first drying processing section 50. Thus, when the glass slide transporting section 120 transports the glass slide 10 to the smearing processing section 40 and then the process at the smearing processing section 40 is completed, the glass slide 10 can be promptly transported to the first drying processing section 50 by the glass slide transporting section 140 provided separately from the glass slide transporting section 120. The glass slide transporting section 140 causes the glass slide 10 having been transported to the smearing processing section 40, to move in the Y1 direction, thereby locating the glass slide 10 at the processing position of the first drying processing section 50.

The first drying processing section 50 has a function of receiving from the smearing processing section 40 the glass slide 10 having a specimen smeared thereon, and of blowing air to the smear region 10a of the glass slide 10. The first drying processing section 50 can dry, by blowing air, the specimen smeared on the glass slide 10.

In the configuration example shown in FIG. 5, the glass slide transporting section 140 is configured to further send out the glass slide 10 having been sent out to the first drying processing section 50, from the first drying processing section 50 to the glass slide transporting section 150. The glass slide transporting section 140 causes the glass slide 10 having been transported to the first drying processing section 50, to move in the Y1 direction, thereby delivering the glass slide 10 to the glass slide transporting section 150 as a third transporting section.

The glass slide transporting section 150 is disposed at the Y1 direction side of the first drying processing section 50 and the staining processing section 160, and is provided so as to extend in the X direction. The glass slide transporting section 150 is configured to transport, in an X1 direction, the glass slide 10 from the first drying processing section 50 to a taking-out position between the staining processing section 160 and the slide setting section 170. The glass slide transporting section 150 has an accommodation part for accommodating the glass slide 10, and can cause the accommodation part to move in the X direction. The glass slide transporting section 150 receives in the accommodation part the glass slide 10 in a state of being laid substantially parallel to the installation surface, brings the glass slide 10 into a state of standing substantially perpendicularly to the installation surface, and then, transports the glass slide 10 to the taking-out position. Thus, at the taking-out position, the glass slide 10 is held in a state in which the smear surface thereof stands along the up-down direction (the Z direction). The glass slide 10 transported to the taking-out position is transported to the staining processing section 160 or the slide setting section 170.

The staining processing section 160 is configured to stain the specimen smeared on the glass slide 10. The staining processing section 160 is arranged alongside the first drying processing section 50, at the X1 direction side with respect to the first drying processing section 50, and is configured to receive the glass slide 10 transported in the X1 direction from the first drying processing section 50.

The staining processing section 160 is provided so as to extend in the Y direction. The staining processing section 160 includes: a staining chamber which stores a staining liquid 701; and a washing chamber which stores a washing liquid 702. In the staining processing section 160, a staining process and a washing process are performed in the staining chamber and the washing chamber, respectively, on a smeared glass slide 10.

The slide setting section 170 is disposed at the Y1 direction side of the staining processing section 160, and is configured to hold the glass slide 10 such that the glass slide 10 can be taken in and out. In the slide setting section 170, a plurality of slide storage containers 240 each capable of storing a plurality of the glass slides 10 can be set.

The glass slide transporting section 180 can transport the glass slide 10 among the staining processing section 160, the slide setting section 170, and the taking-out position of the glass slide transporting section 150. The glass slide transporting section 180 can move, in each of the X direction, the Y direction, and the Z direction, at height positions above the staining processing section 160, the slide setting section 170, and the taking-out position of the glass slide transporting section 150, for example. Thus, the glass slide transporting section 180 can grip and take out the glass slide 10 disposed at each of the staining processing section 160, the slide setting section 170, and the taking-out position of the glass slide transporting section 150, and can transport the glass slide 10 to each of the staining processing section 160, the slide setting section 170, and the taking-out position. The taking-out position of the glass slide transporting section 150 can be a position between the staining processing section 160 and the slide setting section 170. Accordingly, the taking-out position of the glass slide transporting section 150 can be a position that is near both of the staining processing section 160 and the slide setting section 170, and thus, the glass slide 10 can be efficiently transported from the taking-out position of the glass slide transporting section 150 to both of the staining processing section 160 and the slide setting section 170.

With the configuration in which the glass slide transporting section 180 transports the glass slide 10 among the staining processing section 160, the slide setting section 170, and the taking-out position of the glass slide transporting section 150, the smear preparing apparatus 100 can cause the glass slide 10 having been subjected to the printing process and the smearing process, to be transported not only from the taking-out position to the staining processing section 160, but also from the taking-out position to the slide setting section 170. In addition, the smear preparing apparatus 100 can cause a glass slide 10 having a specimen smeared thereon and manually set by the user in the slide setting section 170, to be transported from the slide setting section 170 to the staining processing section 160. Accordingly, in addition to the operation in a normal mode in which the printing process, the smearing process, and the staining process are performed, it becomes possible to perform an operation in a smear mode in which a glass slide 10 having been subjected to the printing process and the smearing process is sent out to the slide setting section 170 without being subjected to the staining process, and an operation in a stain mode in which a glass slide 10 having a specimen smeared thereon and manually set by the user in the slide setting section 170 is subjected to the staining process by the staining processing section 160, to be sent out to the slide storage section 200. Since various operations according to the need of the user can be performed, the convenience of the apparatus is improved. Since the slide setting section 170 is disposed at the near side of the staining processing section 160, the user can perform the setting work and collecting work of slide storage container 240 with respect to the slide setting section 170, or the setting work and collecting work of the glass slide 10 with respect to the slide storage container 240, at the near side of the apparatus, as in the case of the slide supplying section 20. Thus, the user can further easily perform his/her work, and the usability of the smear preparing apparatus 100 is further improved.

In the configuration example shown in FIG. 5, the slide supplying section 20 and the slide setting section 170 are each arranged at the Y2 direction side with respect to the specimen transporting section 210. The slide supplying section 20 and the slide setting section 170 are adjacent to the specimen transporting section 210 at the Y2 direction side with respect to the specimen transporting section 210. Accordingly, the slide supplying section 20 and the slide setting section 170 can be arranged along side with each other at a position in the vicinity of the specimen transporting section 210 which is disposed at the near side of the apparatus. Thus, the portion where the user performs work can be intensively provided at the near side of the apparatus. Thus, the positions for the setting work of a specimen container 211 to the specimen transporting section 210, the setting work of a new glass slide 10 to the slide supplying section 20, and the taking-out work or setting work of a glass slide 10 having a specimen smeared thereon with respect to the slide setting section 170 can be intensively provided at positions in the vicinity of the near side of the apparatus. Accordingly, the user can easily perform his/her work, and thus, the convenience of the apparatus is improved.

In the configuration example shown in FIG. 5, the glass slide transporting section 180 can transport the glass slide 10 not only to the staining processing section 160, the slide setting section 170, and the taking-out position, but also to the second drying processing section 190 and the slide storage section 200. The transportation of the glass slide 10 to the second drying processing section 190 and the slide storage section 200 may be performed by a transporting section different from the glass slide transporting section 180.

In the configuration example shown in FIG. 5, the second drying processing section 190 is arranged alongside the staining processing section 160, at the Y2 direction side with respect to the staining processing section 160. The second drying processing section 190 receives the glass slide 10 transported in the Y2 direction from the staining processing section 160.

The second drying processing section 190 has a function of drying, by blowing air, the glass slide 10 having been subjected to staining in the staining processing section 160, for example. The second drying processing section 190 delivers the dried glass slide 10 to the slide storage section 200.

The slide storage section 200 has a function of receiving and storing the glass slide 10 for which the processes have ended. In the configuration example shown in FIG. 5, the slide storage section 200 is arranged alongside the second drying processing section 190, at the X1 direction side with respect to the second drying processing section 190, and receives the glass slide 10 transported in the X1 direction from the second drying processing section 190.

In the slide storage section 200, a plurality of the slide storage containers 240 each capable of storing the glass slides 10 can be set. In the slide storage section 200, an empty slide storage container 240 set at a setting position is moved in the Y2 direction to a storing position. The storing position is a position adjacent at the X1 direction side to the second drying processing section 190. The glass slide transporting section 180 causes the glass slide 10 to move from the second drying processing section 190 in the X1 direction, and sets the glass slide 10 for which the processes have ended, into the slide storage container 240 at the storing position. In the slide storage section 200, the slide storage container 240 accommodating the glass slide 10 is moved in the X1 direction and then in the Y1 direction, to be located at a collecting position. The setting position and the collecting position are positions arranged alongside the slide supplying section 20 and the slide setting section 170 in the X direction. The user can take out the slide storage container 240 disposed at the setting position.

In the configuration example shown in FIG. 5, the slide storage section 200 includes a first transport path 201 and a second transport path 202. The first transport path 201 causes the slide storage container 240 to move in the Y2 direction, from the setting position at which the slide storage container 240 for storing the glass slides 10 is set, to the storing position at which the glass slides 10 from the second drying processing section 190 are stored in the slide storage container 240. The second transport path 202 causes the slide storage container 240 storing the glass slides 10 at the storing position, to move in the Y1 direction, to the collecting position arranged alongside the setting position at the X1 direction side with respect to the setting position. Accordingly, due to the configuration in which the setting position and the collecting position are disposed at the near side (Y1 direction side) of the apparatus body, the setting work and collecting work of the slide storage container 240 in the slide storage section 200 can be performed at the near side of the apparatus, as in the case of the slide supplying section 20. Thus, the user can further easily perform his/her work, and the usability of the smear preparing apparatus 100 is further improved.

The controller 230 includes a CPU and a memory not shown, and controls operations of each section of the smear preparing apparatus 100. For example, the controller 230 controls operations of the dropping part 411, the smearing member 42, and the glass slide transporting sections 120 and 140. The controller 230 includes an output unit 231. The output unit 231 is a display unit such as a liquid crystal monitor, for example. The output unit 231 may be a printer.

With this configuration, the smear preparing apparatus 100 can perform the processes of the printing process, the specimen smearing process, the staining process on the glass slide 10, thereby being able to automatically prepare a smear.

(Configuration of Smearing Processing Section)

Figure 6:
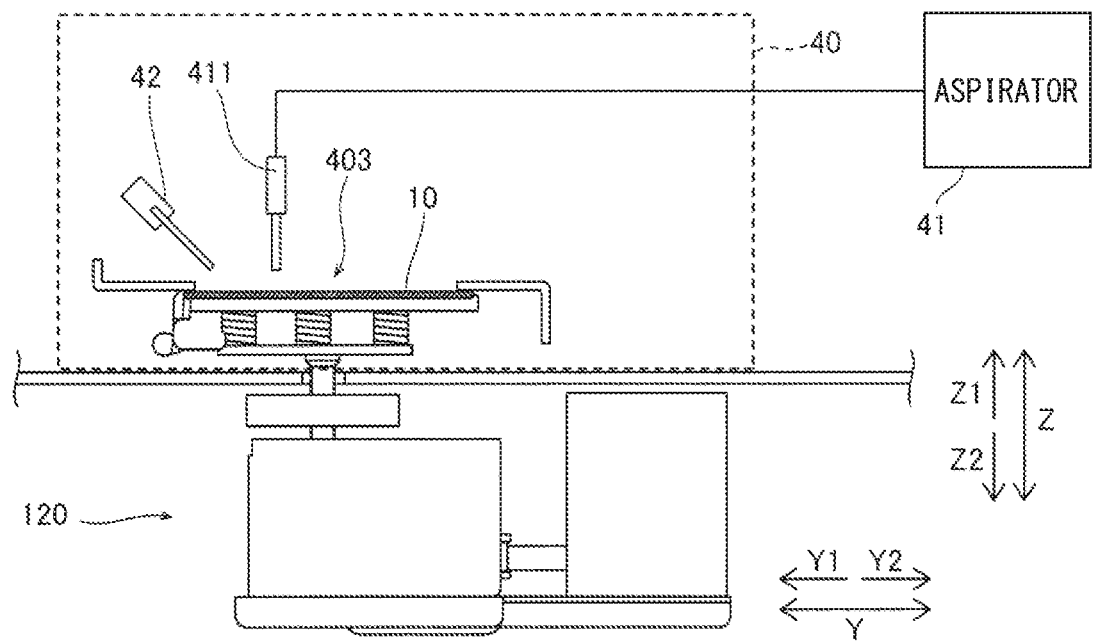
FIG. 6 is a schematic side view showing a smearing processing section and a glass slide transporting section.

In the configuration example shown in FIG. 6, the smearing processing section 40 is configured to perform a process on the glass slide 10 held by the glass slide transporting section 120. Accordingly, the smearing processing section 40 can perform a smearing process on the glass slide 10, as it is, on the glass slide transporting section 120, without delivering the glass slide 10 on the glass slide transporting section 120 to another support member.

In the configuration example shown in FIG. 6, the smearing processing section 40 includes the dropping part 411 and the smearing member 42. The dropping part 411 has a function of dropping a sample onto a transported glass slide 10. The smearing member 42 has a function of smearing the dropped specimen on the glass slide 10. Thus, dropping of the specimen onto the glass slide 10 and smearing of the dropped specimen can be performed in the common smearing processing section 40.

The dropping part 411 and the smearing member 42 are both disposed at positions above the glass slide 10 transported by the glass slide transporting section 120. The smearing member 42 smears a sample on the glass slide 10 by being moved on the glass slide 10 while being in contact with the sample. The smearing member 42 is a spreader glass, for example. The smearing member 42 can move in the up-down direction (the Z direction) and the Y direction by means of a movement mechanism not shown. In the configuration example shown in FIG. 6, since the glass slide transporting section 120 can move in the X-Y directions, there is no need to provide a mechanism for causing the smearing member 42 to move in the X direction. The dropping part 411 is in fluid connection with the aspirator 41, and is implemented as a nozzle which discharges a specimen aspirated by the aspirator 41. The dropping part 411 can move in the X direction (the direction orthogonal to the drawing sheet of FIG. 6), for example, by means of a movement mechanism not shown.

In the smearing processing section 40, the dropping part 411 is moved above the smear region 10*a* to drop a sample to the smear region 10*a*. Subsequently, in the smearing processing section 40, the end face of the smearing member 42 is brought into contact with a droplet of the specimen, and the smearing member 42 is left to stand for several seconds. As a result, the sample spreads in the short direction (the X direction) of the glass slide 10 along the end face of the smearing member 42. Then, by causing the smearing member 42 to move in the longitudinal direction (the Y direction) of the glass slide 10, the specimen is smeared on the smear region 10*a*. The smearing processing section 40 is provided with the smearing member washing part 43 (see FIG. 1) which washes the smearing member 42 by means of the washing liquid 12 every time a smear is prepared. Specifically, the smearing member 42 is washed by means of the washing liquid 12 every time a smear is prepared.

In the present embodiment, the controller 230 is configured to perform control of washing the smearing member 42 by: causing the glass slide transporting section 120 to transport the glass slide 10 to the smearing position 403; causing the dropping part 411 to drop the washing agent 11 onto the glass slide 10; and causing the smearing member 42 to be in contact with the washing agent 11 on the glass slide 10. Thus, since the smearing member 42 can be washed by means of the washing agent 11 dropped on the glass slide 10, the smearing member 42 can be washed by means of the washing agent 11, separately from washing of the smearing member 42 performed for each smearing. Accordingly, the attached matter accumulated on the smearing member 42 can be effectively removed, and thus, the shape of the end face of the smearing member 42 can be maintained to be constant. Thus, the smeared state can be maintained to be constant. In addition, since the smearing member 42 can be washed by use of the dropping part 411, the glass slide transporting section 120, and the glass slide 10 which are used for smearing, there is no need to separately provide structures such as a member, a mechanism, and a fluid circuit dedicated for washing. Thus, the configuration of the apparatus can be simplified. Since washing for removing the attached matter accumulated on the smearing member 42 can be automated, increase in the burden of work on the user can be suppressed. As a result of these, even when the number of times of smearing is increased, the smeared state can be maintained at a desired state, while increase in the burden of work on the user is suppressed.

The controller 230 may perform control such that the smearing member 42 is washed by means of the washing agent 11 at a place other than on the glass slide 10. For example, the controller 230 may perform control such that the smearing member 42 is washed by means of the washing agent 11 in a washing chamber. The controller 230 performs: control of causing the smearing member 42 to be washed by means of the washing liquid 12; and control of causing the smearing member 42 to be washed by means of the washing agent 11 which has stronger detergency than the washing liquid 12. In addition, the controller 230 performs control such that the number of times of washing the smearing member 42 by means of the washing agent 11 is smaller than the number of times of washing the smearing member 42 by means of the washing liquid 12.

The controller 230 is configured to perform control of washing the smearing member 42, by causing the smearing member 42 to be in contact with the washing agent 11 on the glass slide 10 for a predetermined time period. Specifically, the controller 230 is configured to perform control such that the time period, for which the smearing member 42 is caused to be in contact with the washing agent 11 when the smearing member 42 is washed, is longer than the time period for which the smearing member 42 is caused to be in contact with a sample when a smear is prepared.

The controller 230 is configured to perform control of washing the smearing member 42 by causing the smearing member 42 to move on the glass slide 10 while causing the smearing member 42 to be in contact with the washing agent 11 on the glass slide 10. The controller 230 is configured to perform control of removing the washing agent 11 attached to the smearing member 42, by causing the smearing member 42 to be washed by means of the washing liquid 12 by the smearing member washing part 43 after causing the smearing member 42 to be washed by means of the washing agent 11 (see FIG. 1). Specifically, the controller 230 is configured to perform control such that the time period, for which the smearing member 42 is washed by means of the washing agent 11, is longer than the time period for which the smearing member 42 is washed by means of the washing liquid 12 by the smearing member washing part 43 when a smear is prepared.

The controller 230 is configured to perform control such that the amount of the washing agent 11 to be dropped on a glass slide 10 by the dropping part 411 when the smearing member 42 is washed is greater than the amount of a sample to be dropped on a glass slide 10 by the dropping part 411 when a smear is prepared.

The controller 230 is configured to perform control of causing the smearing member 42 to be washed by means of the washing agent 11 on the glass slide 10, and then causing the glass slide transporting section 140 to send out the glass slide 10 from the smearing position 403. With this configuration, since the glass slide 10 disposed at the smearing position 403 in order to wash the smearing member 42 can be moved, the glass slide 10 can be prevented from becoming an obstacle at the time of sending-in of the next glass slide 10 to the smearing position 403. The glass slide 10 having been used in order to wash the smearing member 42 is transferred to the slide setting section 170. Then, the glass slide 10 having been used in order to wash the smearing member 42 is discarded by the user.

The glass slide 10 to be used in order to wash the smearing member 42 is supplied from the slide supplying section 20, and is transported by the glass slide transporting section 120. After the attached matter on the glass slide 10 on the glass slide transporting section 120 is removed by the attached matter removing section 130, the glass slide 10 on the glass slide transporting section 120 is transported to the smearing processing section 40 without being subjected to the printing process. Then, the washing agent 11 is dropped on the glass slide 10 in a state of being held by the glass slide transporting section 120. A printing process may be performed on the glass slide 10 that is to be used in order to wash the smearing member 42. In this case, by providing printing that allows recognition of the fact that the glass slide 10 is used in order to wash the smearing member 42, the glass slide 10 can be easily distinguished from a glass slide 10 subjected to the smearing process performed by the user.

The controller 230 is configured to perform control of causing the smearing member 42 to be washed by means of the washing agent 11 on the basis of an operation of turning off the power supply of the smear preparing apparatus 100. That is, the controller 230 is configured to perform control of causing the smearing member 42 to be washed by means of the washing agent 11 on the basis of an operation for shutting down the smear preparing apparatus 100. Since the smearing member 42 can be washed by means of the washing agent 11 at the timing of ending the use of the smear preparing apparatus 100, the smear preparing process can be inhibited from entering a waiting state due to washing of the smearing member 42. In this case, the controller 230 may perform control such that washing at the staining processing section 160 is performed in parallel. The controller 230 may be configured to perform control of causing the smearing member 42 to be washed by means of the washing agent 11 on the basis of an operation of turning on the power supply of the smear preparing apparatus 100.

The controller 230 is configured to perform control of causing the smearing member 42 to be washed by means of the washing agent 11 on the basis of the fact that a mode for washing the smearing member 42 has been selected. If the smearing member 42 needs to be washed during a smear preparing process, the smearing member 42 can be washed by means of the washing agent 11, and thus, the smeared state can be reliably maintained at a desired state.

For example, the user selects maintenance on a menu screen, and selects smearing member washing. Then, the user sets a container 212 containing the washing agent 11 to a rack 213 in the specimen transporting section 210. Then, when the user presses a start button, the container 212 is pulled in, and the washing agent 11 is aspirated, whereby the smearing member 42, the aspiration line, and the waste liquid chamber are washed. It should be noted that the container 212 contains the washing agent 11 by a sufficient amount for washing the smearing member 42, the aspiration line, and the waste liquid chamber.

(Configuration of First Drying Processing Section and Sending-Out Mechanism)

Figure 7:
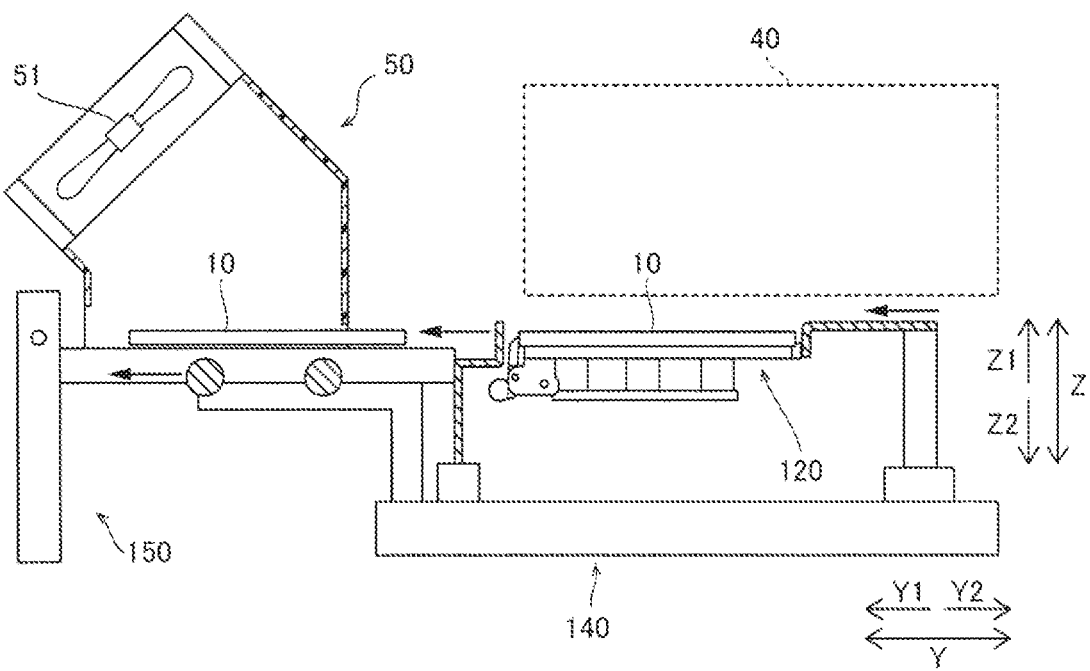
FIG. 7 is a schematic side view for describing a first drying processing section and a sending-out mechanism.

Next, with reference to FIG. 7, the first drying processing section 50, the glass slide transporting section 140, and the glass slide transporting section 150 are described. In the configuration example shown in FIG. 7, the glass slide transporting section 140 is provided at the position where the smearing processing section 40 is disposed. The glass slide transporting section 140 can push out the glass slide 10 from the glass slide transporting section 120 in the Y1 direction, thereby being able to deliver the glass slide 10 to the first drying processing section 50.

The glass slide transporting section 140 can move in the Y direction. The glass slide transporting section 140 can come into contact with the end face at the Y2 direction side of the glass slide 10 to send out the glass slide 10 in the Y1 direction from the glass slide transporting section 120 located at the smearing processing section 40, to the first drying processing section 50.

The first drying processing section 50 includes an air blowing fan 51 disposed at a position above the glass slide 10. The air blowing fan 51 blows air obliquely downwardly to the Y2 direction side, toward the glass slide 10.

In the configuration example shown in FIG. 7, the glass slide transporting section 140 can push out the glass slide 10 from the first drying processing section 50 in the Y1 direction, to deliver the glass slide 10 to the glass slide transporting section 150. The glass slide transporting section 140 can push out the accommodation part of the glass slide transporting section 150 in the Y1 direction, to cause the glass slide transporting section 150 to rotate. Specifically, the accommodation part of the glass slide transporting section 150 can rotate about the rotation shaft extending in the X direction. When the glass slide 10 is to be sent out from the first drying processing section 50 to the glass slide transporting section 150, the accommodation part of the glass slide transporting section 150 is pushed by the glass slide transporting section 140, to be rotated to have an attitude extending in the horizontal direction. After the glass slide transporting section 150 receives the glass slide 10, the glass slide transporting section 150 is rotated to have an attitude extending in the perpendicular direction.

(Detailed Configuration of Specimen Transporting Section and Aspirator)

Figure 8:
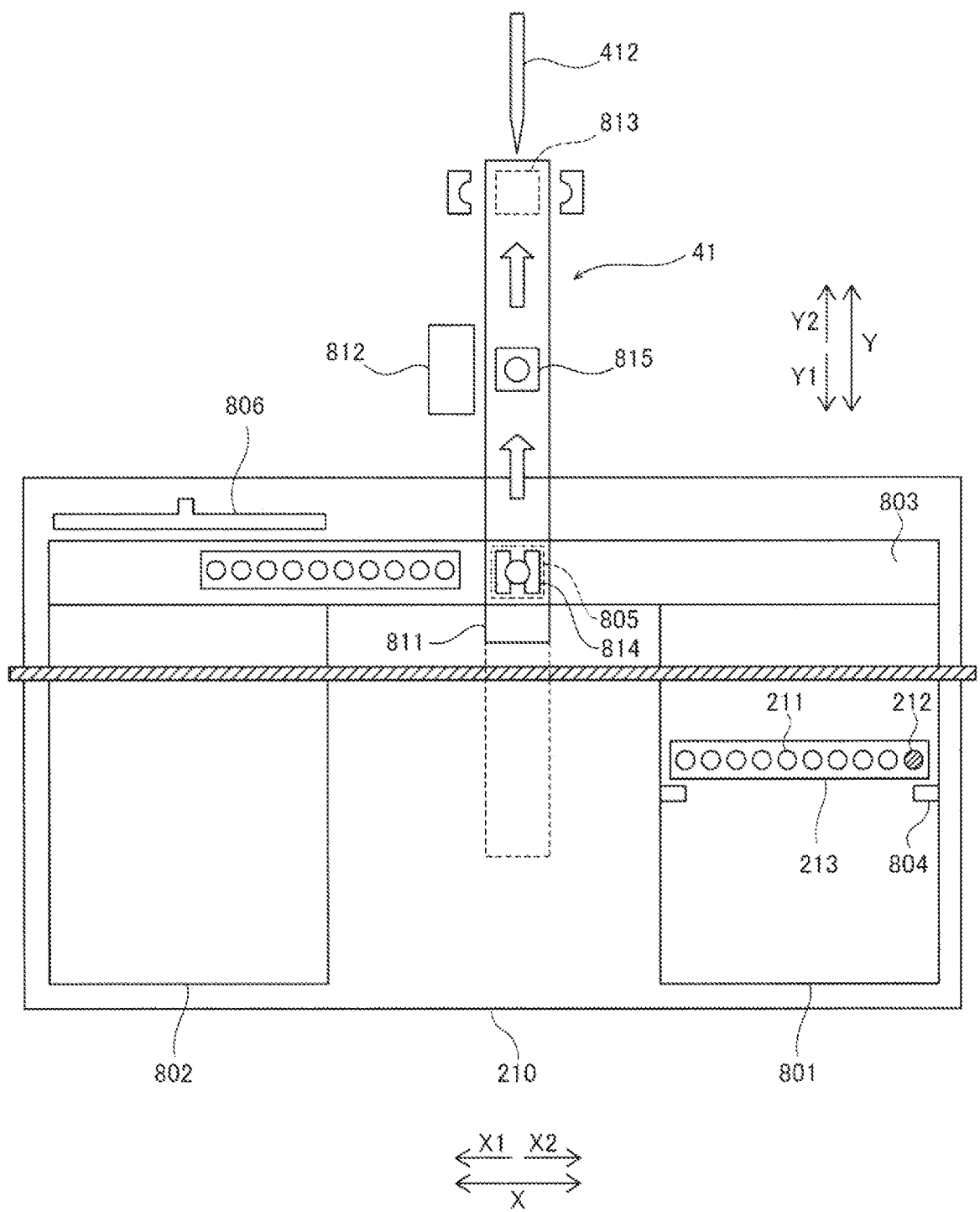
FIG. 8 is a schematic diagram showing configurations of a specimen transporting section and an aspirator.

The configurations of the specimen transporting section 210 and the aspirator 41 are described with reference to FIG. 8. The specimen transporting section 210 includes: a first holder 801 and a second holder 802 each capable of holding a rack 213 which accommodates a specimen container 211 and a container 212; and a transport line 803 which transports the rack 213. The first holder 801 and the second holder 802 are arranged in the horizontal direction, and the first holder 801 is disposed at the X2 direction side and the second holder 802 is disposed at the X1 direction side. The transport line 803 is disposed at the Y2 direction side of the first holder 801 and the second holder 802. The transport line 803 extends in the X direction and connects the first holder 801 and the second holder 802.

The first holder 801 is a region in a recessed shape and for holding a rack 213 placed by the user. At each of both lateral faces of the first holder 801, a claw part 804 is provided so as to be able to protrude. By moving in the Y2 direction in a protruding state, the claw parts 804 push the rack 213 in the Y2 direction to send out the rack 213 to the transport line 803.

The transport line 803 is a belt conveyor and transports the rack 213 in the X1 direction.

The aspirator 41 is provided at the upper side of the transport line 803. The aspirator 41 includes a specimen container setting part 811, a bar code reader 812, and the aspiration tube 412. The specimen container setting part 811 includes a grip part 814 which grips the specimen container 211 or the container 212. The grip part 814 moves downwardly, grips the specimen container 211 or the container 212 at a supply position 805 on the transport line 803, moves upwardly, and takes out the specimen container 211 or the container 212 from the rack 213. By swinging the specimen container 211 or the container 212 gripped by the grip part 814, the specimen container setting part 811 agitates the specimen in the specimen container 211 or the reagent in the container 212.

The specimen container setting part 811 can move in the Y direction. The specimen container setting part 811 moves in the Y2 direction in a state where the grip part 814 grips the specimen container 211 or the container 212, whereby the specimen container setting part 811 transfers the specimen container 211 or the container 212 into the smear preparing apparatus 100.

The specimen container setting part 811 transfers the specimen container 211 or the container 212 to a reading position 815 inside the smear preparing apparatus 100. A bar code label having a bar code of a specimen ID printed thereon is attached to the specimen container 211. A bar code label having a bar code of a reagent ID printed thereon is attached to the container 212. The bar code reader 812 reads the specimen ID from the bar code of the specimen container 211 located at the reading position 815. The bar code reader 812 reads the reagent 1D from the bar code of the container 212 located at the reading position 815. Accordingly, the controller 230 obtains information of the specimen and the reagent to be aspirated.

The specimen container setting part 811 further transfers the specimen container 211 or the container 212 in the Y2 direction to be located at an aspiration position 813. The aspiration tube 412 in a tubular shape and having a pointed end penetrates the cap of the specimen container 211 or the container 212, and aspirates the specimen or the reagent.

After the specimen has been aspirated, the specimen container setting part 811 moves in the Y1 direction, and the grip part 814 moves downwardly, whereby the specimen container 211 or the container 212 is returned to the original position thereof in the rack 213.

The second holder 802 is a region in a recessed shape and for holding a rack 213 for which the specimen aspiration has been performed. A rack transfer part 806 movable in the Y1 direction is provided at the Y2 direction side of the transport line 803. When the transport line 803 has transported the rack 213 to the end in the X1 direction, the rack transfer part 806 moves in the Y1 direction. Accordingly, the rack 213 is pushed by the rack transfer part 806 to be moved in the VI direction, and reaches the second holder 802.

The specimen container setting part 811 can protrude, in the Y1 direction, out of the housing of the smear preparing apparatus 100. The user can set a specimen container 211 in the specimen container setting part 811 sent out in the Y1 direction. The specimen container setting part 811 having the specimen container 211 set therein moves in the Y2 direction, whereby the specimen container 211 is transferred into the smear preparing apparatus 100. After the specimen has been aspirated, the specimen container setting part 811 advances to the outside of the sinew preparing apparatus 100 again. Accordingly, the specimen container 211 is returned to the user.

(Detailed Configuration of Staining Processing Section and Glass Slide Transporting Section)

Figure 9:
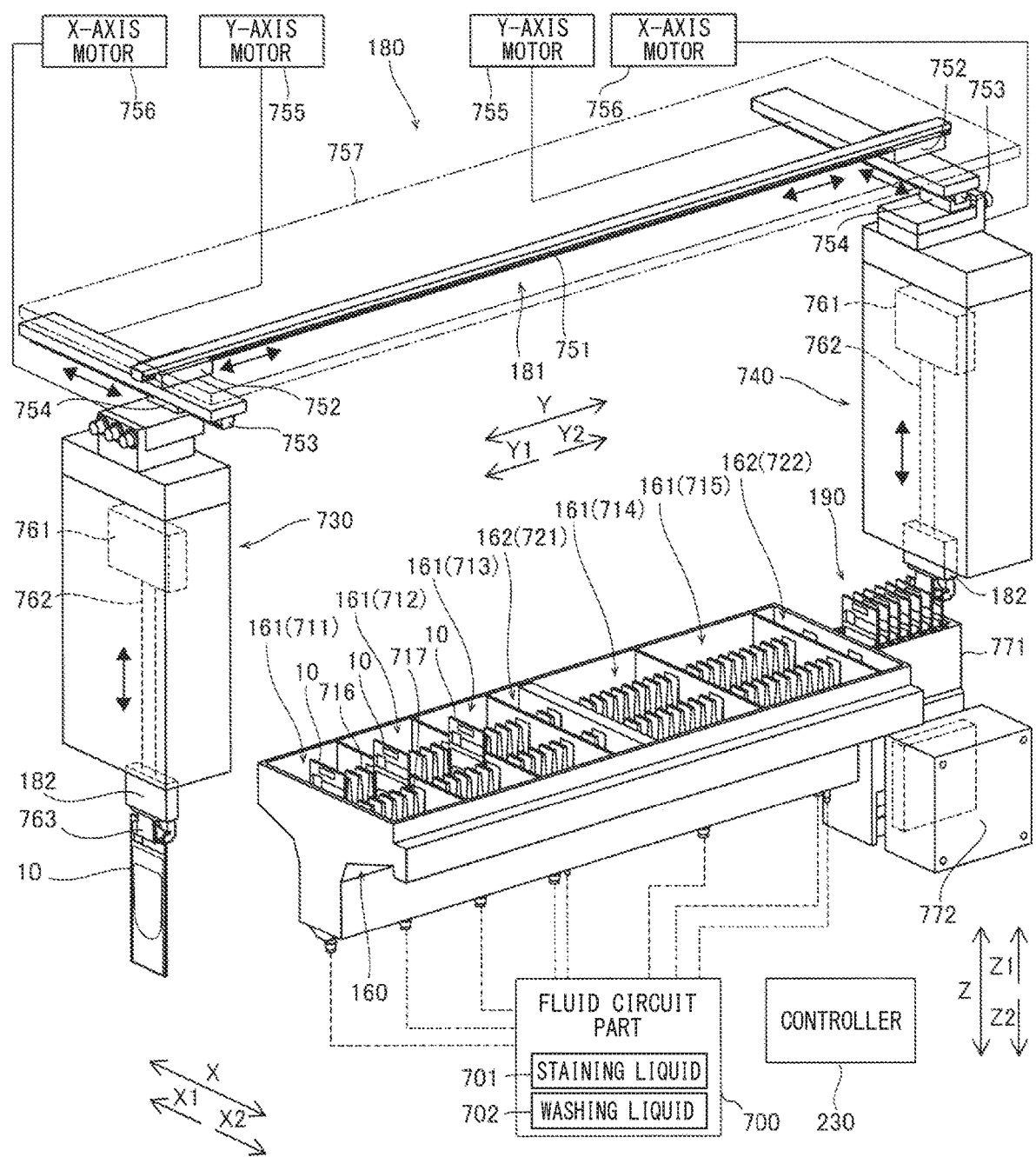
FIG. 9 is a perspective view showing a staining processing section and a glass slide transporting section.

The configurations of the staining processing section 160 and the glass slide transporting section 180 are described with reference to FIG. 9. In the description below, the up-down direction is referred to as the Z direction.

The staining processing section 160 includes staining chambers 161 and washing chambers 162. The smear preparing apparatus 100 includes a fluid circuit part 700 for supplying and discharging the staining liquid 701 and the washing liquid 702 to and from each staining chamber 161 and each washing chamber 162.

The staining chamber 161 and the washing chamber 162 each have a container shape being open at the upper side thereof, and can store therein the staining liquid 701 and the washing liquid 702, respectively. In each of the staining chamber 161 and the washing chamber 162, the glass slide 10 of which width direction is in the X direction and of which thickness direction is in the Y direction can be inserted.

The staining chambers 161 preferably include a first staining chamber 711 and a second staining chamber 712. FIG. 9 shows an example in which the staining chambers include five staining chambers 161, i.e., the first staining chamber 711, the second staining chamber 712, a third staining chamber 713, a fourth staining chamber 714, and a fifth staining chamber 715.

The washing chambers 162 include a first washing chamber 721 and a second washing chamber 722.

In the staining processing section 160, the first staining chamber 711, the second staining chamber 712, the third staining chamber 713, the first washing chamber 721, the fourth staining chamber 714, the fifth staining chamber 715, and the second washing chamber 722 are sequentially arranged in the Y2 direction.

Inside the staining chamber 161, a first holder 716 and a second holder 717 each having a plate shape are provided so as to be separated from each other in the X direction. In addition, a plurality of the first holders 716 and a plurality of the second holders 717 are arranged in the Y direction at equal intervals. One glass slide 10 is inserted in a space between a first holder 716 and a second holder 717, and another first holder 716 and another second holder 717 adjacent thereto. Both end portions in the width direction of the inserted glass slide 10 are supported by the first holders 716 and the second holders 717, whereby the standing state of the glass slide 10 is maintained. Also in the washing chamber 162, the glass slide 10 can be held in a standing state.

The glass slide 10 is sequentially transported to the chambers, starting from the first staining chamber 711, and is processed by being immersed for a predetermined time period, in the staining liquid 701 or the washing liquid 702 stored in each chamber.

The glass slide transporting section 180 is disposed above (Z1 direction) the staining processing section 160 and the slide setting section 170. The glass slide transporting section 180 preferably includes a first transporting section 730 and a second transporting section 740. Since the second transporting section 740 is provided separately from the first transporting section 730, transportation of the glass slide 10 from the taking-out position to the staining processing section 160, and transportation of the glass slide 10 from the staining processing section 160 to the slide storage section 200 can be performed separately, which improves the transportation efficiency. Each of the first transporting section 730 and the second transporting section 740 can move in the horizontal direction (i.e., the X direction and the Y direction) by means of a movement mechanism 181.

The movement mechanism 181 includes: a Y-axis rail 751 and a Y-axis slider 752 which extend in the Y direction; an X-axis rail 753 and an X-axis slider 754 which extend in the X direction; and a Y-axis motor 755 and an X-axis motor 756. As each of the Y-axis motor 755 and the X-axis motor 756, a stepping motor or a servo motor can be employed, for example.

The Y-axis rail 751 is fixed to the lower face of a support member 757. The support member 757 is a ceiling part, a support beam member, or the like of the housing of the smear preparing apparatus 100. The Y-axis slider 752 is mounted at the lower face side (Z2 direction side) of the Y-axis rail 751, and can move along the Y-axis rail 751. The Y-axis motor 755 causes the Y-axis slider 752 to move in the Y direction through a transmission mechanism not shown. As the transmission mechanism, a belt-pulley mechanism, a rack-pinion mechanism, or the like can be employed, for example.

The X-axis rail 753 is fixed to the lower face of the Y-axis slider 752. The X-axis slider 754 is mounted at the lower face side (Z2 direction side) of the X-axis rail 753 and can move along the X-axis rail 753. The X-axis motor 756 causes the X-axis slider 754 to move in the X direction through a transmission mechanism not shown.

The Y-axis slider 752, the X-axis rail 753, the X-axis slider 754, the X-axis motor 756, and the Y-axis motor 755 are each provided in a pair. The first transporting section 730 is mounted at the lower face side of one of the X-axis sliders 754, and the second transporting section 740 is mounted at the lower face side of the other of the X-axis sliders 754. Thus, the first transporting section 730 and the second transporting section 740 can move in the X direction independently of each other along the individual X-axis rails 753. In addition, the first transporting section 730 and the second transporting section 740 can move in the Y direction independently of each other along the common Y-axis rail 751.

The first transporting section 730 and the second transporting section 740 have a common configuration with each other. Each of the first transporting section 730 and the second transporting section 740 includes a hand 182, a Z-axis motor 761 for raising and lowering the hand 182, and a transmission mechanism 762. The Z-axis motor 761 causes the hand 182 to be raised and lowered through the transmission mechanism 762. As the transmission mechanism 762, a belt-pulley mechanism, a rack-pinion mechanism, or the like can be employed, for example.

The hand 182 can grip one glass slide 10. FIG. 9 shows a configuration example in which the glass slide 10 is gripped in the thickness direction thereof by a pair of gripping plates 763. The pair of gripping plates 763 sandwiches the glass slide 10 by coming into contact with the surface and the back surface of the glass slide 10. The pair of gripping plates 763 can move relative to each other in the thickness direction (the Y direction) of the glass slide 10. Movement of the gripping plates 763 can be realized by use of an actuator such as an air cylinder, a motor, or a solenoid, for example. The hand 182 may be configured to sandwich the glass slide 10 in the width direction thereof.

The first transporting section 730 can move to positions above the first staining chamber 711, the second staining chamber 712, the third staining chamber 713, and the first washing chamber 721. Thus, the first transporting section 730 can insert and pull out the glass slides 10 one by one into and out of each of the first staining chamber 711, the second staining chamber 712, the third staining chamber 713, and the first washing chamber 721.

The first transporting section 730 can also move to positions above the taking-out position and the slide setting section 170. Thus, the first transporting section 730 can pull out one glass slide 10 from the taking-out position, and also can insert and pull out the glass slides 10 one by one into and out of the slide setting section 170.

The second transporting section 740 can move to positions above the first washing chamber 721, the fourth staining chamber 714, the fifth staining chamber 715, and the second washing chamber 722. Thus, the second transporting section 740 can insert and pull out the glass slides 10 one by one into and out of each of the first washing chamber 721, the fourth staining chamber 714, the fifth staining chamber 715, and the second washing chamber 722.

The second transporting section 740 can also move to positions above the second drying processing section 190 and the storing position of the slide storage section 200. Thus, the second transporting section 740 can insert and pull out the glass slides 10 one by one into and out of the second drying processing section 190, and also can insert the glass slides 10 one by one into the slide storage container 240 at the storing position of the slide storage section 200.

The first transporting section 730 and the second transporting section 740 can respectively transport the glass slides 10 in parallel with each other. The operation range of the first transporting section 730 and the operation range of the second transporting section 740 overlap each other at the first washing chamber 721, and the glass slide 10 is delivered at the first washing chamber 721. The delivery position may be a position other than the first washing chamber 721.

The second drying processing section 190 includes an accommodation part 771 and an air-blowing part 772. The accommodation part 771 is a container being open at the upper side thereof, and can accommodate a plurality of the glass slides 10 each in a standing state. The air-blowing part 772 can blow air into the accommodation part 771. By the air-blowing part 772 blowing air, the stained glass slides 10 accommodated in the accommodation part 771 are dried.

(Smear Preparing Operation Performed by Smear Preparing Apparatus)

An example of smear preparing operation performed by the smear preparing apparatus 100 is described with reference to FIG. 10. Control of the smear preparing apparatus 100 is performed by the controller 230.

Figure 10:
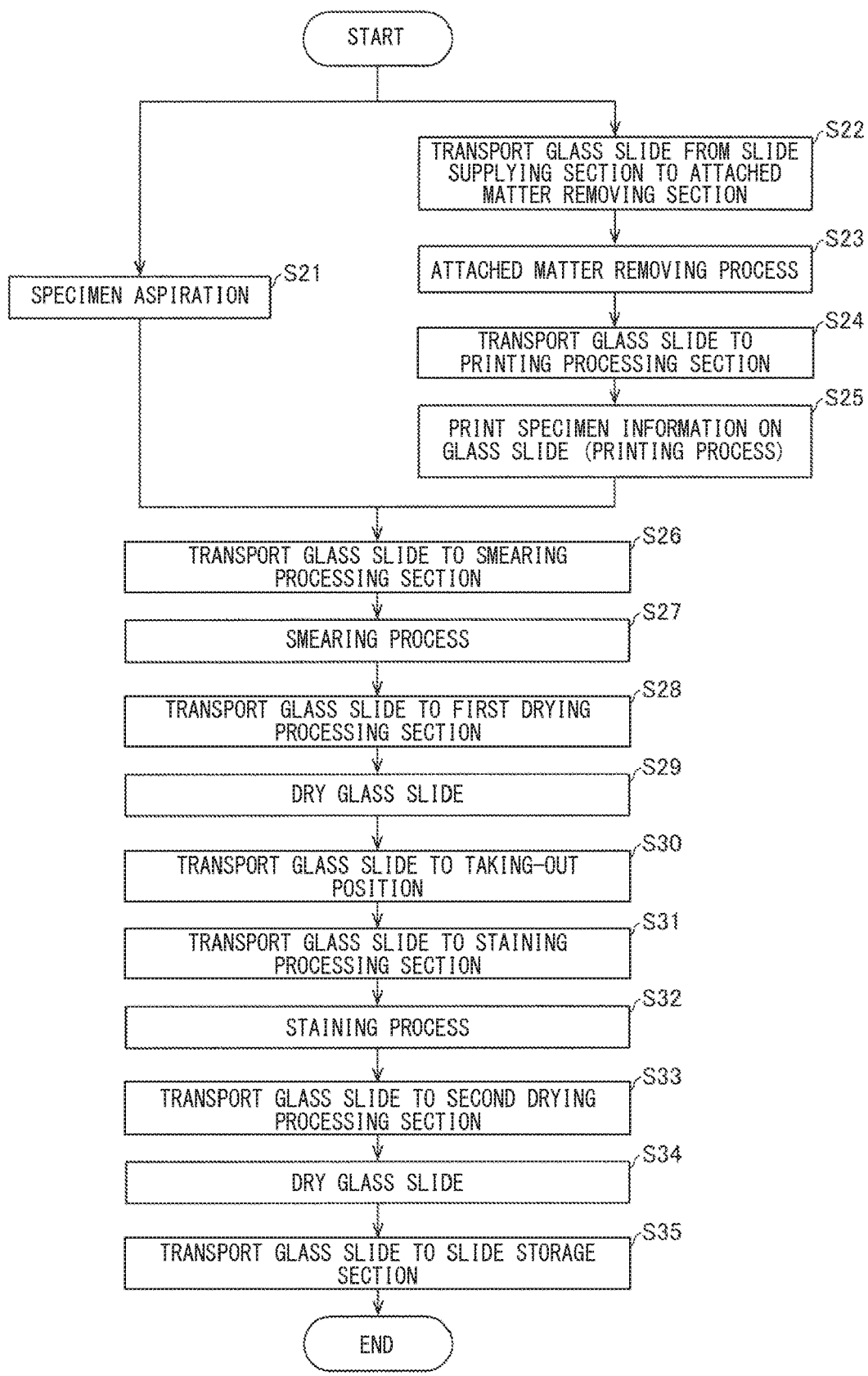
FIG. 10 is a flow chart for describing a smear preparing process.

First, in step S21 shown in FIG. 10, a specimen aspiration process is performed. A specimen is aspirated by the aspirator 41, from a specimen container 211 transported by the specimen transporting section 210 to an aspiration position. In step S22, in parallel with the process in step S21, a glass slide 10 is transported to the attached matter removing section 130. Specifically, the glass slide 10 is supplied from the slide supplying section 20 to the glass slide transporting section 120. Then the glass slide 10 held by the glass slide transporting section 120 is transported to the attached matter removing section 130. In step S23, an attached matter removing process for the glass slide 10 held by the glass slide transporting section 120 is performed by the attached matter removing section 130.

In step S24, the glass slide 10 is transported to the printing processing section 30 by the glass slide transporting section 120. In step S25, the printing process is performed by the printing processing section 30, on the glass slide 10 held by the glass slide transporting section 120.

In step S26, the glass slide 10 is transported to the smearing processing section 40 by the glass slide transporting section 120. In step S27, the smearing process is performed by the smearing processing section 40, on the glass slide 10 held by the glass slide transporting section 120.

In step S28, the glass slide 10 is transported to the first drying processing section 50. Specifically, the glass slide 10 is delivered by the glass slide transporting section 140, from the glass slide transporting section 120 to the first drying processing section 50. In step S29, the drying processing is performed by the first drying processing section 50, on the specimen smeared on the glass slide 10.

In step S30, the glass slide 10 is transported to the taking-out position by the glass slide transporting section 150. Specifically, the glass slide 10 is delivered by the glass slide transporting section 140, from the first drying processing section 50 to the accommodation part of the glass slide transporting section 150. The glass slide transporting section 150 transports the glass slide 10 set in the accommodation part, to the taking-out position.

In step S31, the glass slide 10 is transported to the staining processing section 160. Specifically, the glass slide 10 is taken out from the glass slide transporting section 150 at the taking-out position to be transported to the staining processing section 160, by the glass slide transporting section 180.

In step S32, the staining process is performed by the staining processing section 160, on the specimen smeared on the glass slide 10. The glass slide 10 is sequentially transported to the staining chambers and the washing chambers in accordance with the order of the process steps. During this procedure, the glass slide 10 moves in the staining processing section 160, from Y1 direction side to the Y2 direction side.

In step S33, the glass slide 10 is transported to the second drying processing section 190. Specifically, the glass slide 10 is delivered by the glass slide transporting section 180, from the staining processing section 160 to the second drying processing section 190. In step S34, the drying processing is performed by the second drying processing section 190, on the specimen smeared and stained on the glass slide 10. As a result, a smear is prepared on the glass slide 10.

In step S35, the glass slide 10 is transported to the slide storage section 200. Specifically, the glass slide 10 is delivered by the glass slide transporting section 180, from the second drying processing section 190 to the slide storage container 240 disposed at the storing position of the slide storage section 200. Then, the slide storage container 240 is transported to the collecting position. At the collecting position, the glass slide 10 having the smear prepared thereon is stored in the slide storage section 200: Then, the smear preparing process is ended.

It should be noted that, in the case of the smear mode in which the processes up to the smearing process are performed, when the glass slide 10 transported to the taking-out position in step S30 is transported by the glass slide transporting section 180 to the slide setting section 170, the process ends. The user can collect, from the slide setting section 170, the unstained glass slide 10 having been subjected to the printing process and the smearing process.

In the case of the stain mode in which the processing starts from the staining process, the processes in step S31 and the steps thereafter are performed on a smeared glass slide 10 set in the slide setting section 170 by the user. In this case, the glass slide 10 is transported by the glass slide transporting section 180 from the slide setting section 170 to the staining processing section 160.

(Automatic Specimen Aspiration Operation)

Figure 11:
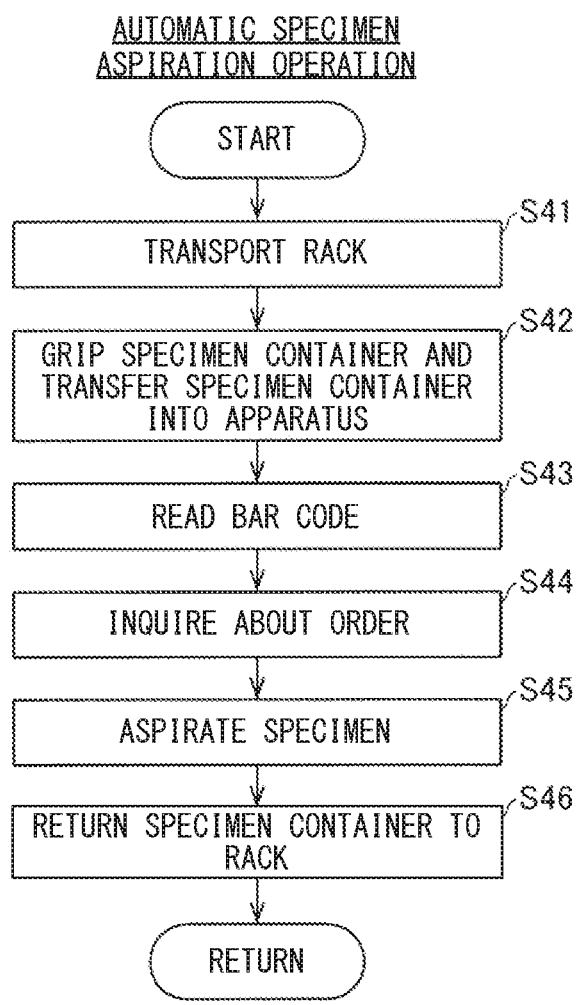
FIG. 11 is a flow chart for describing an automatic specimen aspiration operation.

A specimen aspiration process of the smear preparing operation performed by the smear preparing apparatus 100 is described in detail with reference to FIG. 11. Control of the smear preparing apparatus 100 is performed by the controller 230. The automatic specimen aspiration operation is operation of aspirating a specimen from a specimen container 211 automatically transported by the specimen transporting section 210.

In step S41, the specimen transporting section 210 transports a rack 213 and locates one specimen container 211 at the supply position 805. In step S42, the grip part 814 takes out the specimen container 211 at the supply position 805 from the rack 213, agitates the specimen, and then transfers the specimen container 211 into the smear preparing apparatus 100.

In step S43, the specimen container setting part 811 transfers the specimen container 211 to the reading position 815, and the bar code reader 812 reads the specimen ID from the bar code of the specimen container 211. In step S44, the controller 230 transmits the read specimen ID to a host computer not shown, and inquires about an order. The order includes a smearing condition and a staining condition. In step S45, the specimen container setting part 811 transfers the specimen container 211 to the aspiration position 813, and the aspiration tube 412 aspirates the specimen from the specimen container 211. Then, the specimen container setting part 811 returns the specimen container 211 to the original position thereof in the rack 213, and the automatic specimen aspiration operation ends.

It should be noted that, when the smearing member 42 is to be washed by means of the washing agent 11, the container 212 containing the washing agent 11 is taken out from the rack 213, instead of the specimen container 211. Then, similarly to the specimen container 211, the container 212 is transferred to the aspiration position 813, and the washing agent 11 is aspirated from the container 212 by the aspiration tube 412.

It should be noted that the embodiments disclosed herein are merely illustrative in all aspects and should not be considered as restrictive. The scope of the present invention is defined not by the description of the above-described embodiments but by the scope of the claims, and includes meaning equivalent to the scope of the claims and all changes (modifications) within the scope.

What is claimed is:

1. A method for washing a smearing member, the method comprising:
   dropping a washing agent on a glass slide; and
   contacting the smearing member with the washing agent on the glass slide to wash the smearing member, wherein the smearing member has smeared a biological sample; and
   wherein the washing agent is a solution that contains a component that degrades protein of the biological sample.

2. The method for washing the smearing member of claim 1, wherein:
   the smearing member is washed by causing the smearing member to be in contact with the washing agent on the glass slide for a predetermined time period.

3. The method for washing the smearing member of claim 2, wherein
   the time period for which the smearing member is caused to be in contact with the washing agent is longer than a time period for which the smearing member is caused to be in contact with the sample when a smear is prepared.

4. The method for washing the smearing member of claim 1, wherein
   the smearing member is washed by causing the smearing member to move on the glass slide while causing the smearing member to be in contact with the washing agent on the glass slide.

5. The method for washing the smearing member of claim 1, wherein
   the smearing member is washed by means of a washing liquid different from the washing agent every time a smear is prepared, and
   the smearing member is washed by causing the smearing member to be in contact with the washing agent on the glass slide, on the basis of a predetermined condition and separately from washing of the smearing member by means of the washing liquid.

6. The method for washing the smearing member of claim 5, wherein
   the washing agent attached to the smearing member is removed by washing the smearing member by means of the washing liquid for washing the smearing member every time a smear is prepared, after washing the smearing member by means of the washing agent.

7. The method for washing the smearing member of claim 6, wherein the washing agent attached to the smearing member is removed by washing the smearing member through application of ultrasonic wave thereto in the washing liquid, after washing the smearing member by means of the washing agent.

8. The method for washing the smearing member of claim 5, wherein
a time period for which the smearing member is washed by means of the washing agent is longer than a time period for which the smearing member is washed by means of the washing liquid when a smear is prepared.

9. The method for washing the smearing member of claim 1, wherein
an amount of the washing agent to be dropped on the glass slide when the smearing member is washed is greater than an amount of the sample to be dropped on a glass slide when a smear is prepared.

10. The method for washing the smearing member of claim 1, wherein
when a smear preparing apparatus, which prepares a smear by causing the smearing member to move on a glass slide while causing the smearing member to be in contact with the sample, is to be shut down, the smearing member is washed by means of the washing agent.

11. The method for washing the smearing member of claim 1, wherein
the washing agent is a solution that contains an oxidizing agent that degrades protein.

12. The method for washing the smearing member of claim 11, wherein
the washing agent is a solution that contains hypochlorite.

13. The method for washing the smearing member of claim 5, wherein
the washing liquid is a solution that contains a surfactant and sodium chloride.

14. A method for washing a smearing member, the method comprising: washing the smearing member by means of a first washing liquid, wherein the smearing member has smeared a biological sample; and washing the smearing member by means of a second washing liquid having stronger detergency than the first washing liquid, wherein the number of times of washing the smearing member by means of the second washing liquid is smaller than the number of times of washing the smearing member by means of the first washing liquid.

15. The method for washing the smearing member of claim 14, wherein
the smearing member is washed by means of the first washing liquid every time a smear is prepared.

16. The method for washing the smearing member of claim 14, wherein
when a smear preparing apparatus which prepares a smear is to be shut down, the smearing member is washed by means of the second washing liquid.

17. The method for washing the smearing member of claim 14, wherein
when a mode for washing the smearing member by means of the second washing liquid is selected, the smearing member is washed by means of the second washing liquid.

18. The method for washing the smearing member of claim 14, wherein
the first washing liquid is a solution that contains a surfactant and sodium chloride, and
the second washing liquid is a solution that contains hypochlorite.

* * * * *